Figure 1:
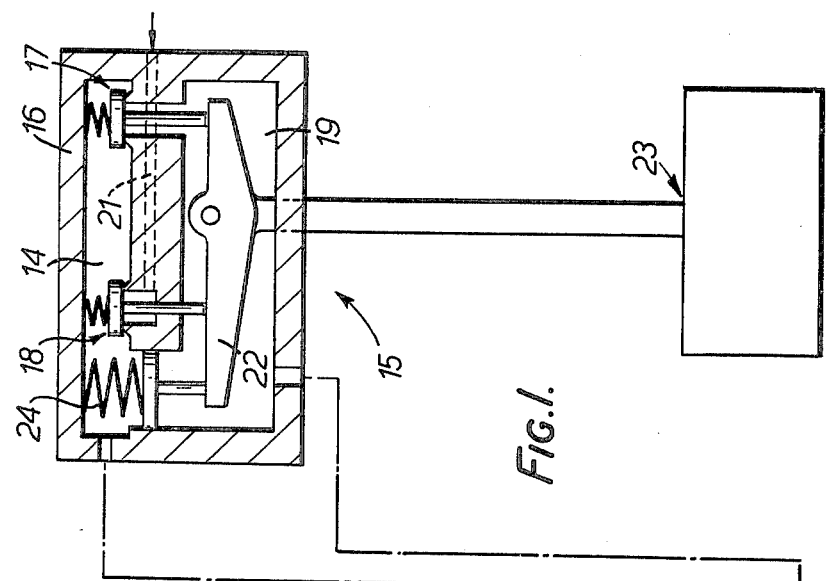
Figure 1:
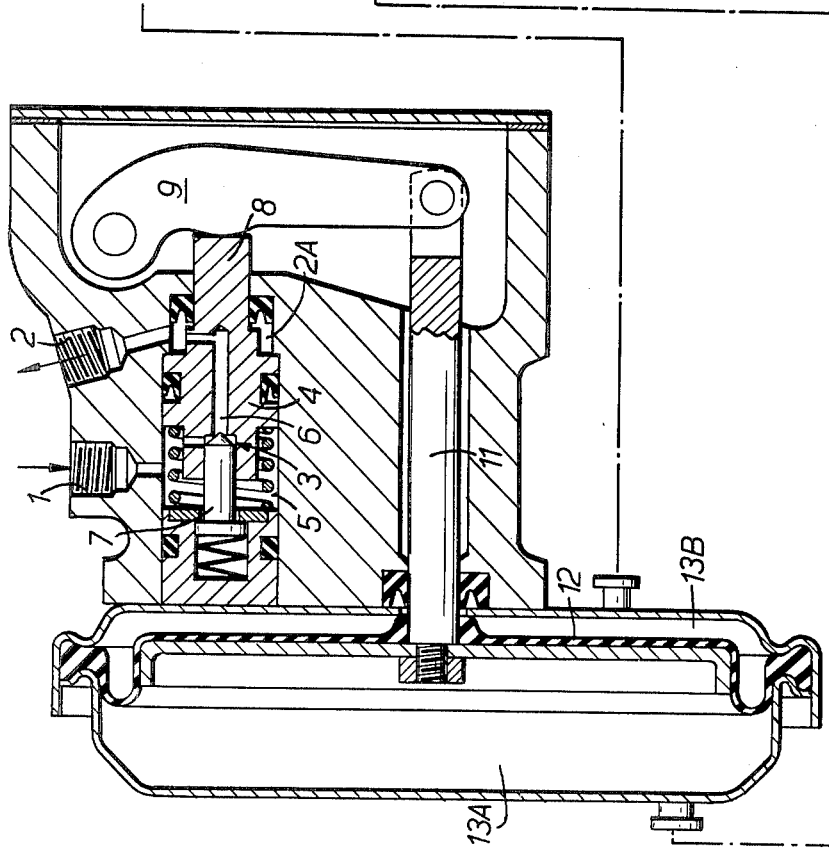

United States Patent [19]

Farr

[11] 4,245,868
[45] Jan. 20, 1981

[54] CONTROL VALVE ASSEMBLY

[75] Inventor: Glyn P. R. Farr, Birmingham, England

[73] Assignee: Girling Limited, Birmingham, England

[21] Appl. No.: 963,159

[22] Filed: Nov. 22, 1978

[30] Foreign Application Priority Data

Nov. 25, 1977 [GB] United Kingdom ............... 49051/77

[51] Int. Cl.³ ............................................. B60T 13/06
[52] U.S. Cl. .................................. 303/6 C; 303/24 F; 303/24 A
[58] Field of Search ................. 303/24 F, 24 A, 24 B, 303/6 C, 114, 115; 188/181 A

[56] References Cited

U.S. PATENT DOCUMENTS

| 3,486,800 | 12/1969 | Ayers | 303/6 C |
| 3,871,713 | 3/1975 | Lister | 303/24 F |
| 3,954,307 | 5/1976 | Young | 303/24 F |

Primary Examiner—Reinhard J. Eisenzopf

Attorney, Agent, or Firm—Scrivener, Clarke, Scrivener and Johnson

[57] ABSTRACT

A control valve assembly for a vehicle braking system comprises an inlet, an outlet, a proportioning valve having a control valve member movable to open and close the valve to control communication between the inlet and the outlet, and an inertia-responsive device, preferably a pendulum, responsive to deceleration of the vehicle and operable to reduce the pressure at the outlet after the valve has closed. The inertia-responsive device supplies a signal in dependence upon deceleration, and a servo system applies a force to the control valve member in response to the signal to move the control valve member in a direction to reduce the outlet pressure. The servo system comprises an auxiliary valve operable in response to movement of the inertia-responsive device, a pressure operable member subjected to a pressure in dependence upon operation of said auxiliary valve, and an arrangement coupling the pressure operable member in force-transmitting relation with the control valve member, whereby said control valve member is subjected to a force which is dependent upon the vehicle deceleration.

10 Claims, 7 Drawing Figures

CONTROL VALVE ASSEMBLY

This invention relates to control valve assemblies for vehicle braking systems and is particularly concerned with such assemblies which incorporate a brake pressure proportioning valve for insertion in a brake pressure line between a pressure source and the rear wheel brakes.

Proportioning valves are known which reduce the outlet pressure applied to the rear wheel brakes, as compared to the full source (inlet) pressure supplied to the front wheel brakes, after a predetermined inlet pressure is attained.

It has previously been proposed to alter the operating characteristics of the valve, for example the predetermined inlet pressure, commonly referred to as the "cut-in" pressure, above which the valve meters the pressure to the outlet, in response to the deceleration of the vehicle. Such valves have inertia-responsive means, for example a ball or a pendulum, movement of which in response to deceleration modifies the operation of the proportioning valve to take account of the deceleration of the vehicle and the shift of load from the rear to the front axle during braking. Such valves use the inertia force to modify the cut-in pressure of the proportioning valve so that when the vehicle is laden the cut-in pressure is greater than when the vehicle is unladen.

Such valves have the disadvantage that during sudden braking, for example in an emergency stop, the full source pressure may be passed through the proportioning valve before the deceleration sensing means modifies the operation of the proportioning valve so that the rear brakes may be over-braked with the consequence that wheel lock may result. In trucks such wheel lock could be very dangerous and in articulated vehicles could cause jack-knifing.

The present invention aims to overcome the aforementioned disadvantage and provides a control valve assembly for a vehicle braking system, comprising an inlet, and outlet, a proportioning valve having a control valve member movable to open and close said valve to control communication between said inlet and said outlet and inertia-responsive means to responsive to deceleration of the vehicle and operable to reduce the pressure at said outlet after said valve has closed.

The inertia-responsive means preferably comprises an inertia responsive device, preferably in the form of a pendulum, which provides a signal in dependence upon deceleration, and a force-applying means which applies a force to the control valve member in response to said signal to move the control valve member to thereby reduce the outlet pressure. The force-applying means preferably comprises a servo system which amplifies the signal from the inertia-responsive device.

The control valve member may be a stepped piston and the force-applying means may apply a force to the piston which acts in the same direction as the output force acting on the piston and in opposition to the force of the inlet pressure acting on the piston.

In particular embodiments of the invention described in more detail below, the inertia-responsive device is arranged to operate an auxiliary valve which creates a pressure differential across a pressure operable member, which may be a diaphragm or a piston, the pressure operable member being connected to the control valve member and movable to apply a load to the control piston in dependence upon the differential pressure which is in turn dependent to the vehicle deceleration. If, due to a rapid brake application, the outlet pressure is too high for the given deceleration, the pressure responsive member overcomes the brake pressure force and the control piston moves to close the proportioning valve and reduce the outlet pressure until the forces acting on the piston are balanced.

The invention is applicable to hydraulic, pneumatic, or "powered hydraulic" systems and an example of each is described below.

Figure 2:
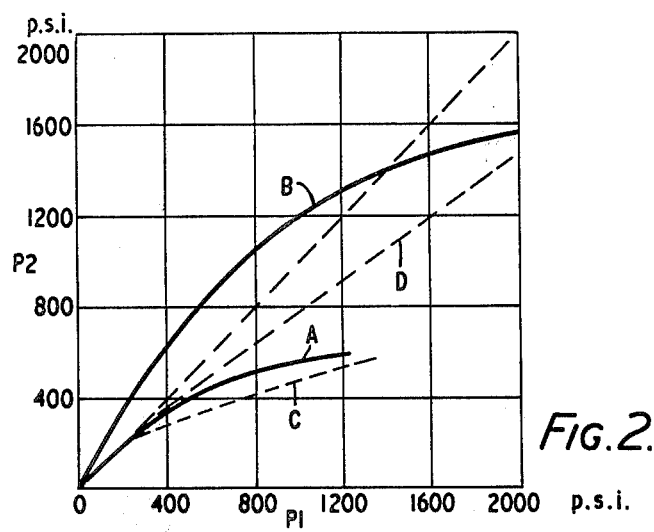
Figure 4:
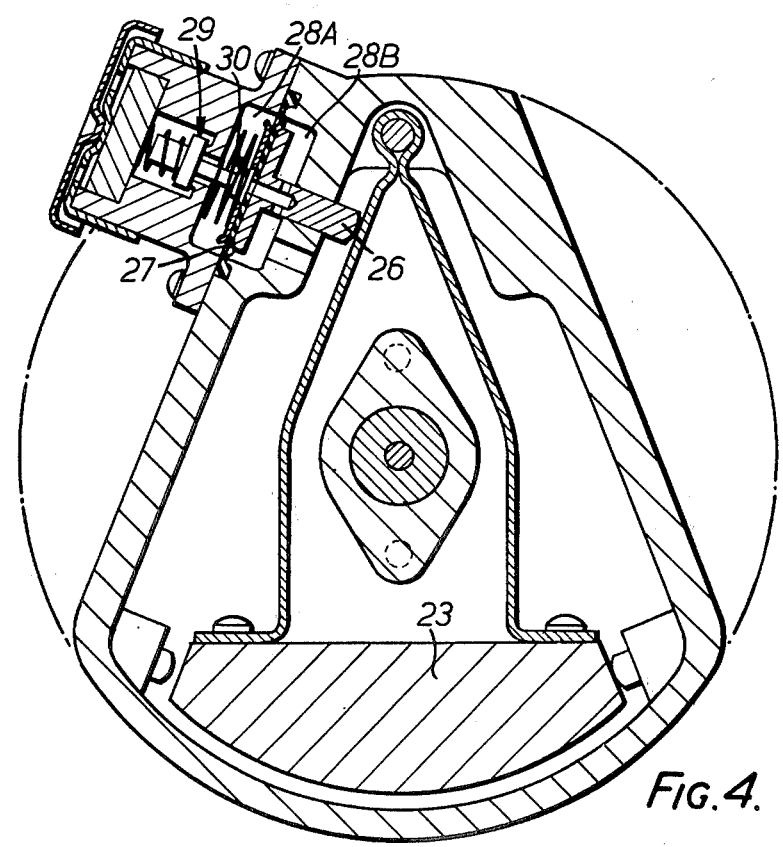
Figure 3:
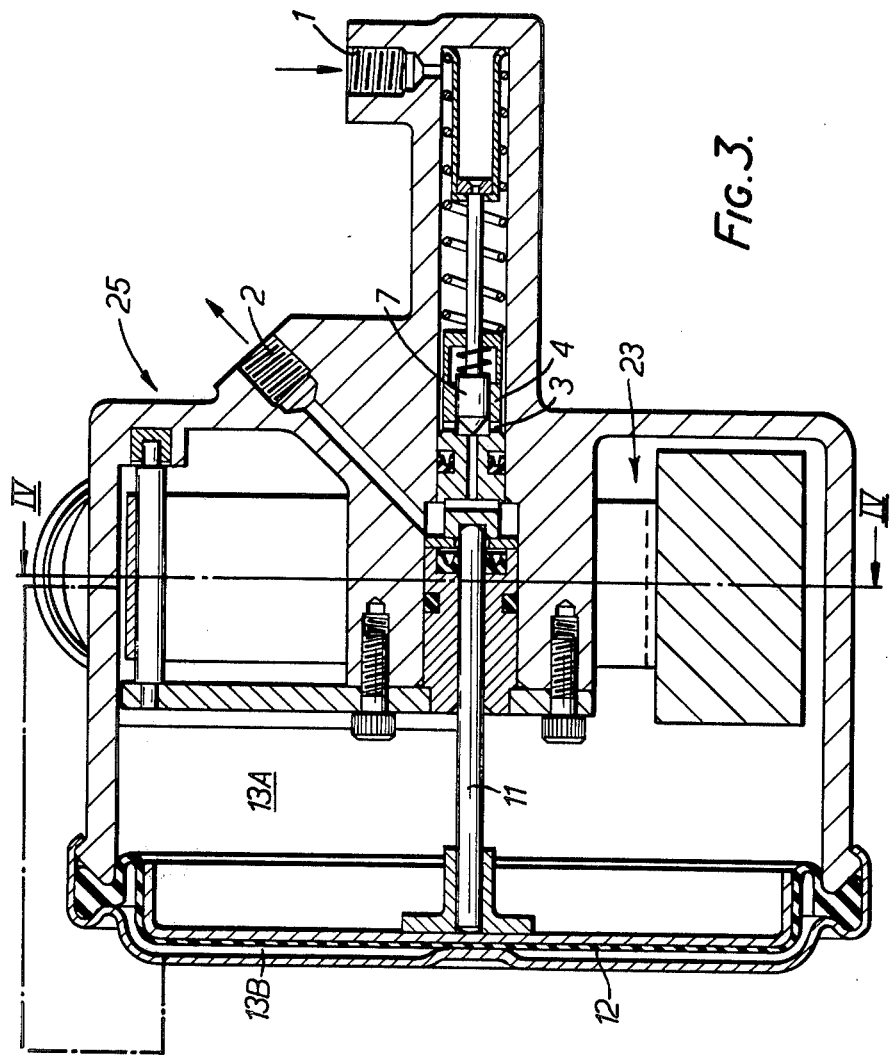
Figure 5:
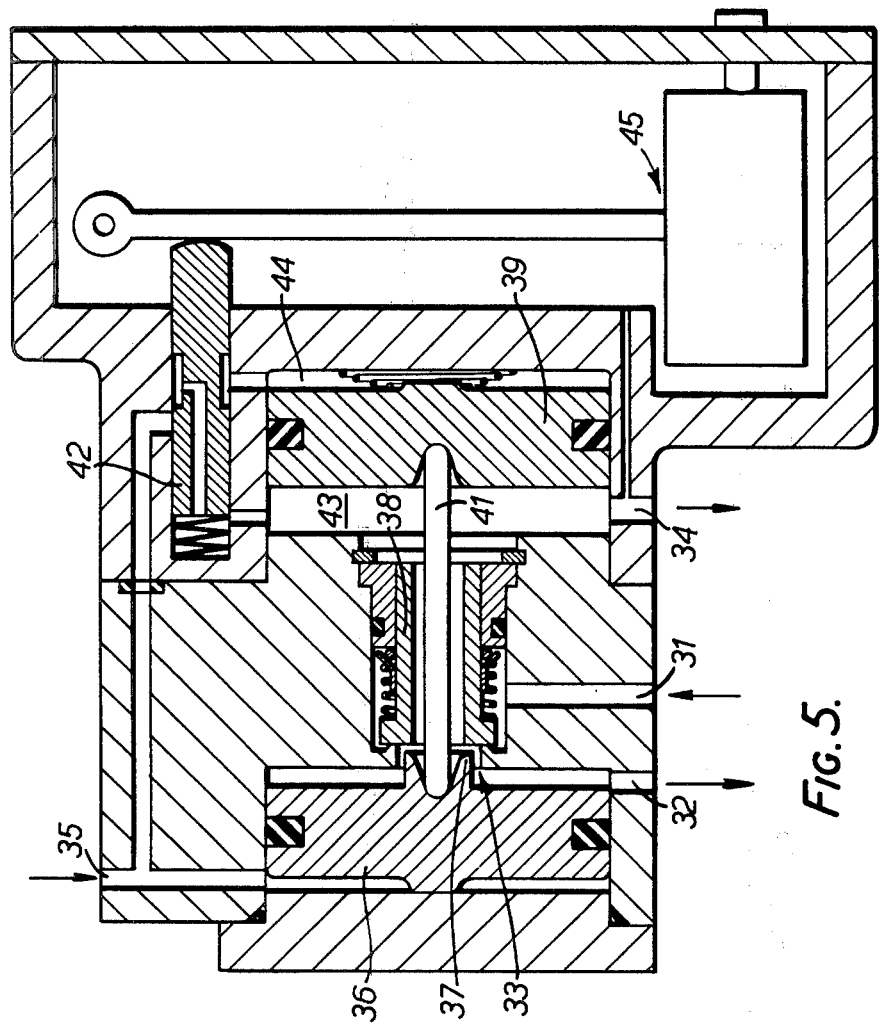
Figure 6:
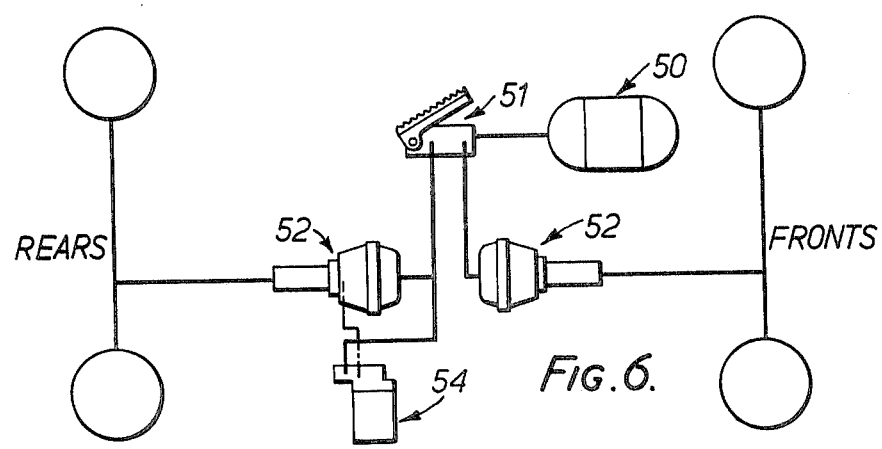
Figure 7:
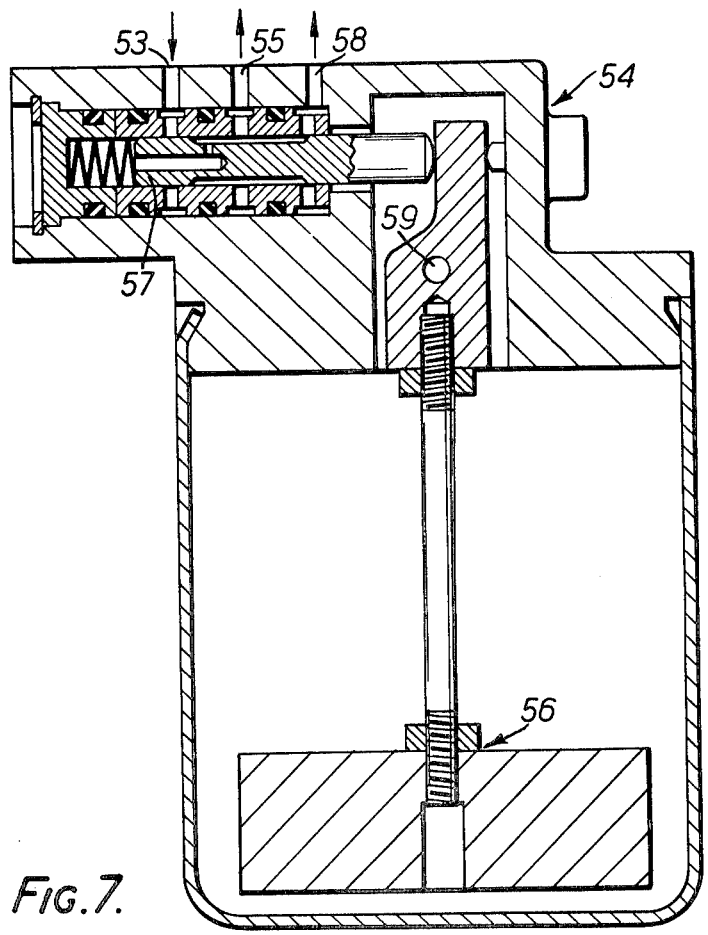

Some control valve assemblies in accordance with the invention for vehicle braking systems will now be described, by way of example, with reference to the accompanying drawings, in which:

FIG. 1 is a diagrammatic sectional view of one embodiment of the invention for a hydraulic braking system, FIG. 2 is a graph of rear brake pressure vs. brake pressure showing ideal curves and actual curves obtained utilising the assembly of FIG. 1, FIG. 3 is an axial cross-section of a modified form of the assembly of FIG. 1, FIG. 4 is a section of the lines IV—IV of FIG. 3, FIG. 5 is an axial cross-section of a form of control valve assembly for a pneumatic braking system, FIG. 6 is a schematic illustration of a power-hydraulic braking system incorporating a control valve assembly in accordance with the invention, and FIG. 7 is an axial cross-section of the control valve assembly of FIG. 6.

The control valve assembly of FIG. 1 comprises an inlet 1 for connection to a source of hydraulic pressure, an outlet 2 for connection to the rear brakes and a proportioning valve 3 controlling flow between the inlet 1 and outlet 2. The valve 3 comprises a differential area control piston 4 slidable in a bore 5 and having fluid flow passageway 6 which is closable by a valve element 7 spring biased towards a valve seat formed on the control piston 4.

The piston 4 is biased to an open position by a control spring 5 and has an extension 8 which passes sealingly from an outlet chamber 2A and engages a lever 9 which is pivoted at one end and arranged to apply a force to the control piston 4 in dependence upon vehicle deceleration. The other end of the lever 9 is connected to a rod 11 which is secured to a pressure-responsive member in the form of a diaphragm 12 separating opposed chambers 13A, 13B, one of which is in use connected to a vacuum and the other of which is connected to a chamber 14 of an inertia-responsive device 15.

The inertia-responsive device 15 comprises a housing 16 in which is an auxiliary valve arrangement having two valves 17, 18, one valve 17 controlling communication between the chamber 14 and another chamber 19 connected to vacuum, and the other valve 18 controlling communication between the chamber 14 and atmosphere through passage 21.

The valves 17, 18 are actuated by a transverse arm 22 which is pivotally mounted in the housing 16 and which is connected to a pendulum 23. The pendulu 23 is, in the illustrated embodiment, arranged on the vehicle so that when the vehicle decelerates the pendulum moves leftwards against the action of a return spring 24.

In operation, when the brakes are applied pressure is transmitted freely from the inlet 1 to the outlet 2 to effect rear wheel braking. When the brakes are actuated and the vehicle decelerates, the pendulum 23 swings to the left as illustrated in the drawings and the valve 18 opens to admit atmospheric pressure to the right hand face of the diaphragm 12. The pressure imbalance causes movement of the diaphragm, and thus the rod 11 and the pivoted lever 9, to the left to apply a force to the control piston 4. If that force together with the force of the outlet pressure acting on the effective area of the piston 4 is sufficient to overcome the inlet pressure force acting on the control piston 4 together with the force of the control spring 5, then the piston moves to the left to close the valve and expand the outlet chamber volume and thereby reduce the outlet pressure and thus the rear braking force.

A further increase in inlet pressure will thereafter be metered to the outlet, the amount of reduction of outlet pressure as compared to inlet pressure being dependent upon the deceleration of the vehicle.

The force applied to the control piston 4 by the lever 9 is dependent upon vehicle deceleration and effectively the diaphragm and lever arrangement provides an amplification of the "g" force of the pendulum 23 to apply a proportional force to the control piston 4. Thus, the operation of the proportioning valve 3 is continuously modified in response to deceleration of the vehicle and the control piston 4 moves to close the valve and expand the outlet chamber only if the outlet pressure for a given deceleration force is too great and requires reduction.

The effective cross-sectional areas of the control piston 4 and the control spring force are chosen to provide inlet vs. outlet pressure curves which approximate to the ideal curves in both the vehicle unladen and the vehicle laden cases. An example is given below of the calculation for a particular vehicle having an unladen weight of 2984 lbs and a laden weight of 5330 lbs.

The ideal curves A,B for the unladen and laden cases respectively are shown in full lines in the graph of FIG. 2. From the graph it is desired that in the unladen case the pressure at which the valve first closes (the "cut-in" pressure) is 200 psi and the pressure is modified to give an outlet pressure ($P_2$) of 500 psi when the inlet pressure ($P_1$) is 1200 psi. The chosen outlet pressure is for reasons known to those skilled in the art, a little below that indicated by the ideal curve.

In the vehicle in question an inlet pressure $P_1$ of 200 psi provides a deceleration of 0.132 g and of 1200 psi a deceleration of 0.862 g.

The forces acting on the control piston 4 may be equated as follows:

$$P_1 A_1 + S = P_2 A_2 + Wg \quad (1)$$

where
$A_1$ = control piston full area (subjected to inlet pressure)
$A_2$ = control piston annular area (subjected to outlet pressure)
$S$ = control spring force
$W$ = 'g' force amplification
$\therefore 200 A_1 + S = 200 A_2 + 0.132 W$
and $1200 A_1 + S = 500 A_2 + 0.862 W$ $$\therefore A_1 = \frac{300 A_2 + .73 W}{1000}$$

If the valve assembly is designed so that
$A_2 = 0.4$ in$^2$
and $W = 600$ then $A_1 = \frac{120 + 440}{1000} .56$ in$^2$ and $S = 47$ lbs To determine the intermediate pressures the valve formula must be equated to the formula for the relationship between brake pressures and deceleration for the vehicle.

For the chosen vehicle this formula is:

$$1.84 P_1 + 1.14 P_2 = Mg + 200 \quad (2)$$

where $M$ = vehicle weight
Also from equation (1)

$$0.56 P_1 - 0.4 P_2 = Wg - S \quad (3)$$

Equation (3) $\times 2.85$ gives $$1.59 P_1 - 1.14 P_2 = 1710 g - 134 \quad (4)$$

Adding equations (2) and (4)

$$3.43 P_1 = 4694 g + 66$$

where $M = 2984$ unladen $$\therefore P_1 = \frac{4694g + 66}{3.43} \text{ lbs/in}^2 \quad (5)$$

and $P_2 = \dfrac{Mg + 200 - 1.84 P_1}{1.14}$ from (2)

when the vehicle is laden however the vehicle weight increases to 5330 (2417.6 Kg) lbs so the formula (5) for $P_1$ becomes $$P_1 = \frac{7040 g + 66}{3.43} \text{ lbs/in}^2$$

by introducing values of 'g' the pressures $P_1$ and $P_2$ are plotted out on the graph for the unladen and fully laden cases and are shown respectively by the two dotted lines C,D.

FIGS. 3 and 4 illustrate a modified form of the assembly of FIG. 1, with the whole assembly mounted in a single housing 25, and the same reference numerals have been used to denote corresponding parts. In this case the rod 11 is axially aligned with the control piston 4 and applies the force directly thereto without using the intermediary pivoting lever 9. Although operation of the inertia-responsive means is similar to that of FIG. 1, its construction is somewhat different. In this embodiment, the pendulum 23 acts on a spigot 26 which is attached to a diaphragm 27 which separates chambers 28A, 28B, chamber 28A being connected to chamber 13B of the main diaphragm 12 and chamber 28B being connected to vacuum. Movement of the diaphragm 27 controls operation of an auxiliary valve 29 controlling flow between chamber 28A and atmosphere and a valve 30 controlling flow between chambers 28A and 28B. In the illustrated inoperative condition valve 29 is closed and valve 30 is open so that both faces of main diaphragm 12 are subjected to vacuum.

Preferably, the assembly is so orientated that the plane of FIG. 4 is horizontal.

Operation of the assembly is similar to that described in relation to FIG. 1. Briefly, deceleration of the vehicle moves the pendulum 23 to the left and opens the valve 29 to permit atmospheric air to pass to the chamber 13B on the left hand side of the main diaphragm 12. The diaphragm 12 then urges the rod 11 to the right to apply a force to the control piston which, if the rear or outlet pressure is sufficient, urges the control piston 4 to the right to close the valve and increase the outlet chamber volume and thus reduce the rear brake pressure. Further increase in inlet pressure in metered to the outlet through the proportioning valve.

FIG. 5 shows an assembly for use in a pneumatic system and comprises a housing having an inlet 31 for connection to an accumulator, an outlet 32 for connection to the rear wheel brakes, a relay valve 33 controlling communication between the inlet 31 and the outlet 32 and between the outlet 32 and an exhaust 34 and an input 35 for connection to a brake actuating arrangement (not shown), the input 35 being pressurised when the brakes are applied. In known manner the input pressure acts on a piston 36 which carries a valve seat 37 so that when the input pressure is applied the piston 36 moves to the right to close off communication between the outlet 32 and exhaust 34 and urge a valve member 38 to the right to open communication between the inlet 31 and the outlet 32 thereby pressurising the brakes.

An auxiliary piston 39 is interconnected with the piston 36 by a rod 41. An auxiliary valve comprises a spool 42 which in the inoperative condition illustrated, communicates chambers 43 and 44 on opposite sides of the piston 39 with each other, the left hand chamber 43 being open to exhaust through port 34.

When deceleration of the vehicle is sensed the pendulum 45 swings to the left to urge the spool 42 leftwardly to cut-off communication between the exhaust port 34 and the chamber 44 and to open communication between that chamber 44 and the input 35, thereby applying a force in opposition to the input pressure force acting on the piston 36.

In the illustrated embodiment the pistons 36,39 are of the same cross-sectional area and the input pressure acting on the piston 36 balances the same pressure acting on the auxiliary piston 39. Thus, the pistons move leftwardly under the action of the outlet pressure acting on the piston 36 to close the communication between the inlet 31 and the outlet 32 and open communication between the outlet 32 and exhaust 34, thereby reducing the rear brake pressure and commencing the metering or proportioning cycle.

FIGS. 6 and 7 show a "powered hydraulic" system in which compressed air from an accumulator 50 is used to actuate hydraulic master cylinders when the brakes are applied. The system is shown in FIG. 6 and comprises the accumulator 50 connected through a pedal-operated valve 51 to the pneumatic/hydraulic actuators 52 which are respectively connected to the front and rear brake circuits. The actuators are in themselves known and need not be fully described here. Briefly each comprises opposed chambers separated by a diaphragm which is connected to a push-rod of a master cylinder.

An inlet 53 of the control valve 54 of FIG. 6 is connected to one side of the diaphragm of the actuator and an outlet 55 is connected to the other side of the diaphragm.

Referring particularly to FIG. 7, the direction of travel of the vehicle is in this case rightwardly and a pendulum 56 is in abutting engagement with a spool 57 which in its inoperative condition connects the outlet 55 to an exhaust port 58 and closes off the inlet 53.

When the brake valve 51 is opened, the pressurised air passes freely to one side of the diaphragm which moves to actuate the master cylinder and apply the rear brakes. As the vehicle decelerates, movement of the pendulum 56 causes a force, which is amplified by the lever ratio between the pendulum 56 and the pivot point 59 and between the pivot point 59 and the point of engagement with the spool 57, which urges the spool 57 to the left to close off the exhaust port 58 and communicate the inlet 53 with the outlet 55. Thus pressure is applied to the left hand chamber of the actuator to reduce the force applied by the actuator to the master cylinder and thus the rear braking pressure. As inlet pressure increases the pressure force acting rightwardly on the spool overcomes the force applied by the pendulum to the spool and the inlet 53 is again closed and the outlet 55 is connected to exhaust so that the diaphragm moves leftwardly to increase the pressure in the master cylinder and thus the rear brakes, and so on. The pressure to the rear brakes is thus metered in dependence upon the force applied by the pendulum which is in itself dependent upon vehicle deceleration.

It will be seen that in each of the above embodiments the operation of the proportioning valve is modified continuously by the deceleration of the vehicle. Furthermore, should the full source pressure applied to the front brakes fail, the pressure to the rear brakes is still applied, but the deceleration is greatly reduced. Thus, there is only a small force applied to the control piston or spool which is insufficient to overcome the brake pressure load and the spring load acting on the control piston or spool. Thus, the rear brakes are applied with full load.

If the vehicle is descending a steep hill the inertia-responsive means is operated by the resulting gravitational forces acting thereon and the control piston or spool loaded so that the pressure applied to the rear brakes is proportionally lower than that applied to the front brakes. Conversely, if the vehicle is ascending the hill the rear brakes are applied with a force which is proportionally greater than when the vehicle is on level ground due to the major part of the vehicle load being taken on the rear wheels.

The above described valve assemblies modify the operation of the proportioning valve at all times and at all decelerations. It is of no consequence that during rapid braking full pressure is applied to the rear brakes since when excessive deceleration is sensed by the inertia-responsive means the pressure on the rear brakes is reduced and the possibility of wheel lock is thereby minimised. In previously proposed arrangements, the surge of full pressure to the rear brakes causes excessive rear wheel braking which is not compensated for further increase in rear brake pressure simply being prevented when excessive deceleration of the vehicle is sensed with the result that initial rear wheel lock is more likely.

Although the weight is shown as a pendulum in the above described embodiments, any mass reacted by the pressure differential could be used. Furthermore, instead of the illustrated valves, electric switches could be actuated to operate solenoid air valves.

The invention is also applicable to "full power" hydraulic systems incorporating an hydraulic pump for the hydraulic brake fluid. Such a system could be obtained by simple modification of the arrangement of FIG. 7, as will be apparent to a man skilled in the art.

We claim:

1. A control valve assembly for a vehicle braking system, comprising an inlet, and outle, a proportioning valve having a control valve member movable to open and close said valve to control communication between said inlet and said outlet, and inertia-responsive means responsive to deceleration of the vehicle and operable to reduce the pressure at said outlet after said valve has closed, wherein said control valve member is a piston, and wherein said inertia-responsive means is operable to apply a force to said piston in the same direction as the force of pressure at the outlet of said valve acting on said piston and in opposition to the force of pressure at the inlet of said valve acting on said piston, the force in said direction urging said piston in a sense to expand said outlet and thereby reduce the outlet pressure.

2. A control valve assembly according to claim 1, wherein said inertia-responsive means comprises an inertia responsive device which supplies a signal in dependence upon deceleration, and a force-applying means which applies a force to said control valve member in response to said signal to move said control valve member in a direction to reduce said outlet pressure.

3. A control valve assembly according to claim 2, wherein said force-applying means comprises amplifying means for amplifying said signal from said inertia responsive device.

4. A control valve assembly according to claim 3, wherein said amplifying means comprises a servo system.

5. A control valve assembly according to claim 4, wherein said servo system comprises an auxiliary valve operable in response to movement of said inertia-responsive device, a pressure operable member subjected to a pressure in dependence upon operation of said auxiliary valve, and means coupling said pressure operable member in force-transmitting relation with said control valve member, whereby said control valve member is subjected to a force which is dependent upon said deceleration.

6. A control valve assembly for a vehicle braking system, comprising an inlet, and outlet, a proportioning valve having a control valve member movable to open and close said valve to control communication between said inlet and said outlet, and inertia-responsive means responsive to deceleration of the vehicle and operable to reduce the pressure at said outlet after said valve has closed, said inertia-responsive means comprising an inertia responsive device which supplies a signal in dependence upon deceleration, and a force-applying means which applies a force to said control valve member in response to said signal to move said control valve member in a direction to reduce said outlet pressure and said force applying means comprising a servo-system for amplifying said signal from said inertia responsive device, wherein said servo system comprises an auxiliary valve operable in response to movement of said inertia responsive device, a pressure operable member subjected to a pressure in dependence upon operation of said auxiliary valve, and means coupling said pressure operable member in force-transmitting relation with said control valve member, where by said control valve member is subjected to a force which is dependent upon said deceleration.

7. A control valve assembly according to claim 6, wherein said control valve member is a piston, and wherein said inertia-responsive means is operable to apply a force to said piston in the same direction as the force of pressure at the outlet of said valve acting on said piston and in opposition to the force of pressure at the inlet of said valve acting on said piston, the force in said direction urging said piston in a sense to expand said outlet and thereby reduce the outlet pressure.

8. A control valve assembly according to claim 6, wherein said control valve member is a piston, and wherein said inertia-responsive means is operable to apply a force to said piston in the same direction as the force of pressure at the outlet of said valve acting on said piston and in opposition to the force of pressure at the inlet of said valve acting on said piston, the force in said direction urging said piston in a sense to expand said outlet and thereby reduce the outlet pressure and wherein said inertia-responsive means comprises a pivoted lever, one end of which is connected to said pressure operable member and which is in force-transmitting relation intermediate its endswith said control valve member.

9. A control valve assembly according to claim 6, wherein the axis of said pressure operable member is co-axial with said control valve member.

10. A control valve assembly according the claim 9, wherein said control valve member is a piston, and wherein said inertia-responsive means is operable to apply a force to said piston in the same direction as the force of pressure at the outlet of said valve acting on said piston and in opposition to the force of pressure at the inlet of said valve acting on said piston, the force in said direction urging said piston in a sense to expand said outlet and thereby reduce the outlet pressure, and wherein said pressure operable member is coupled with said piston by a force transmitting member axially aligned with said piston.

* * * * *